United States Patent
Shen

(10) Patent No.: US 6,807,357 B2
(45) Date of Patent: Oct. 19, 2004

(54) SATURABLE OPTICAL ABSORBER, AND AN APPLICATION THEREOF TO REGENERATING A WAVELENGTH DIVISION MULTIPLEXED SIGNAL

(75) Inventor: Alexandre Shen, Paris (FR)

(73) Assignee: Avanex Corporation, Fremont, CA (US)

( * ) Notice: Subject to any disclaimer, the term of this patent is extended or adjusted under 35 U.S.C. 154(b) by 304 days.

(21) Appl. No.: 10/059,436

(22) Filed: Jan. 31, 2002

(65) Prior Publication Data

US 2002/0105743 A1 Aug. 8, 2002

(30) Foreign Application Priority Data

Feb. 2, 2001 (FR) .............................................. 01 01452

(51) Int. Cl.⁷ ................................................. G02B 6/00
(52) U.S. Cl. ........................ 385/140; 385/24; 359/885; 359/891
(58) Field of Search ................... 385/24, 140; 359/885, 359/891; 372/11

(56) References Cited

U.S. PATENT DOCUMENTS

| | | | |
|---|---|---|---|
| 4,998,236 A | 3/1991 | Henshaw | |
| 5,182,788 A | 1/1993 | Tanaka | |
| 5,404,371 A * | 4/1995 | Kokubo | 372/45 |
| 5,440,148 A * | 8/1995 | Nomoto | 257/21 |
| 5,499,206 A * | 3/1996 | Muto | 365/114 |
| 5,936,258 A * | 8/1999 | Imamura et al. | 257/21 |
| 6,172,793 B1 * | 1/2001 | Heberle et al. | 359/264 |
| 6,281,519 B1 * | 8/2001 | Sugiyama et al. | 257/14 |
| 6,445,000 B1 * | 9/2002 | Masalkar et al. | 257/21 |
| 6,609,839 B1 * | 8/2003 | Devaux et al. | 398/87 |
| 6,657,232 B2 * | 12/2003 | Morkoc | 257/76 |
| 2001/0028755 A1 | 10/2001 | Akiyama | |
| 2002/0171920 A1 * | 11/2002 | Sugawara | 359/344 |

FOREIGN PATENT DOCUMENTS

EP        0 992 842 A1      4/2000

OTHER PUBLICATIONS

PTO 2000–2218, Translation of JP 04–354170.*
Patent Abstracts of Japan, Apr. 30, 1993, vol. 017, No. 219 (E–1358) & JP 04 354170 A Dec. 8, 1992.

* cited by examiner

*Primary Examiner*—Hemang Sanghavi
*Assistant Examiner*—Scott Alan Knauss
(74) *Attorney, Agent, or Firm*—Moser, Patterson & Sheridan, LLP

(57) ABSTRACT

A saturable optical absorber component is made of an inhomogeneous absorption material including a plurality of sets of quantum boxes formed in stacked layers. The sizes of the quantum boxes of each set define an absorption wavelength associated with the set.

7 Claims, 4 Drawing Sheets

A: Nx(a) structure

A: Nx(b) structure

SATURABLE OPTICAL ABSORBER, AND AN APPLICATION THEREOF TO REGENERATING A WAVELENGTH DIVISION MULTIPLEXED SIGNAL

CROSS-REFERENCE TO RELATED APPLICATIONS

This application is based on French Patent Application No. 01 01 452 filed Feb. 2, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to a saturable optical absorber and its application to regenerating a wavelength division multiplexed signal.

2. Description of the Prior Art

A saturable optical absorber is an optical device consisting of a material adapted to absorb an optical signal of low luminous power but to be transparent at high powers. The material of a saturable absorber becomes increasingly transparent to a light beam as the power of the beam increases.

One example of the use of a saturable absorber is to attenuate the unwanted noise between pulses of a power-modulated optical signal.

When a saturable absorber receives a pulse of optical power it becomes transparent and allows the pulse to pass through it. On the other hand, the saturable absorber becomes absorbant and attenuates unwanted noise between the pulses.

In the case of wavelength division multiplexed optical signals, the signal on each channel is power modulated. Thus saturable absorbers can also be used to regenerate wavelength division multiplexed signals.

However, the material constituting saturable absorbers used until now to regenerate wavelength division multiplexed signals has imposed the use of a demultiplexer for spatially separating the optical components with different wavelengths forming the multiplexed signal. The regenerated wavelength division multiplexed signal is obtained by means of a multiplexer after passing these components through a saturable absorber medium.

A wavelength division demultiplexer is required because it is necessary to separate the channels of the signal to direct them to the absorber, not at a single point, as would be the case in the absence of demultiplexing, but at a plurality of clearly separated points, each point corresponding to a channel of given wavelength.

The signal on a channel of wavelength λ1 consists of temporal pulses (corresponding to modulation of the power of the optical signal) representing high logic levels "1" and low logic levels "0". Existing saturable absorber members consist of a material with uniform quantum boxes exhibiting homogeneous absorption throughout a range of wavelengths. FIG. 1B shows the absorption curve of a member of this kind. The dashed line curve SO corresponds to the absorption spectrum for a wave of low luminous power and the continuous line curve SA corresponds to the absorption spectrum for a wave of high luminous power. The figure shows clearly that the whole of the spectrum within the absorption band is modified.

At a given time the signals corresponding to some channels can have a high level "1" while the signals corresponding to other channels have a low level "0". Accordingly, in the absence of demultiplexing, the unwanted noise present at low power levels on some channels is masked by the high levels on other channels. Thus the saturable absorber member cannot reduce noise at low power levels if high levels are present elsewhere.

Consequently, the saturable absorber member is ineffective for a wavelength division multiplexed signal in the absence of demultiplexer and remultiplexer devices.

The present invention proposes a simple solution that does not necessitate the addition of a multiplexer and a demultiplexer and is relatively inexpensive and more compact compared to the prior art solutions.

SUMMARY OF THE INVENTION

The present invention therefore provides a saturable optical absorber including an inhomogeneous absorption material including a plurality of sets of quantum boxes, wherein the sets are associated with respective different absorption wavelengths, the quantum boxes of a given set have dimensions chosen to obtain an absorption wavelength associated with the set, the quantum boxes are disposed in a plurality of stacked layers and the absorber is adapted to enable an incident optical wave to pass through the stacked layers.

Thanks to this feature, it is possible to regenerate a plurality of channels of a wavelength division multiplexed signal without having to demultiplex it. Furthermore, the fact that the optical wave can be processed by propagating through layers of quantum boxes, i.e. with no guiding medium, in the direction perpendicular to the planes of the layers, has the advantage that the device is insensitive to the states of polarization of the channels.

In a first embodiment, each of the layers includes quantum boxes of the same set, layers belonging to different sets are stacked and form an individual absorption structure. The absorber includes a stack comprising a plurality of individual absorption structures.

In a second embodiment, the stack comprises a plurality of layers each including quantum boxes of a plurality of sets.

To limit the height of the stack, and consequently its overall size, and also to limit the fabrication time of the component, the absorber includes two mirrors disposed on respective opposite sides of the stack and parallel to or slightly inclined to the stack.

If the mirrors are parallel to each other, the component obtained forms a resonant cavity inside which the input optical signal is reflected several times and passes through the layers of quantum boxes several times.

In one embodiment the saturable absorber material consists of a wetting layer of a binary material, such as indium arsenide (InAs), followed by a layer of quantum boxes, this alternation of wetting layers and layers of quantum boxes being repeated, the combination being deposited on a substrate, for example of gallium arsenide (GaAs).

The invention also provides an application of a saturable absorber having the above features to regenerating a wavelength division multiplexed signal, wherein the wavelengths associated with the sets are respective optical carrier wavelengths of the multiplexed signal.

Other features and advantages of the invention will become apparent on reading the following description, which is given with reference to the accompanying drawings.

DETAILED DESCRIPTION OF THE PREFERRED EMBODIMENTS

Figure 1A:
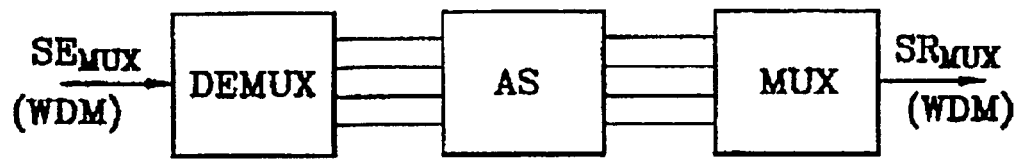
FIG. 1A is a diagram of a signal regenerator system including a prior art saturable absorber.
Figure 1B:
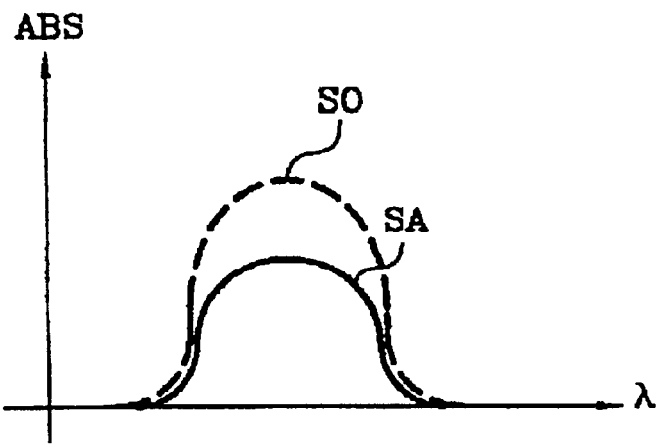
FIG. 1B is a diagram showing curves of the absorption (i.e. the luminous power level of the incident signal) as a function of wavelength for a prior art saturable absorber material.
Figure 2A:
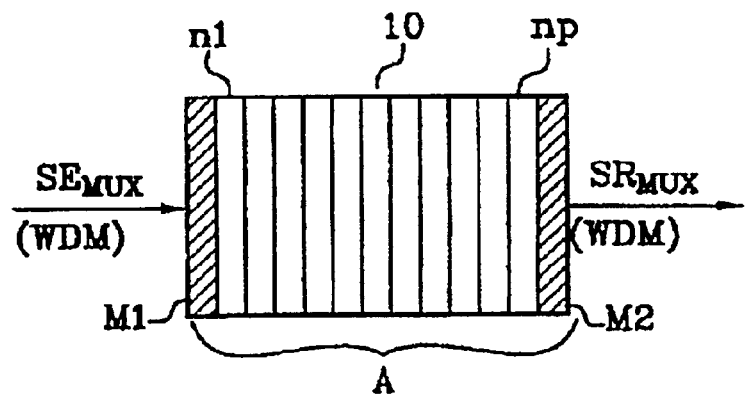
FIG. 2A is the diagram for a saturable absorber according to the invention.

The saturable absorber member 10 in FIG. 2A has a structure that enables it to receive an incident wave to be processed, i.e. a wavelength division multiplexed input optical signal $SE_{MUX}$, and to regenerate that signal to supply a regenerated wavelength division multiplexed signal $SR_{MUX}$.

The member includes an inhomogeneous saturable absorber material with a structure A consisting of individual absorption structures (hereinafter designated "a" or "b") forming a stack of layers in parallel planes, for example the layers n1, np. The member is adapted to receive an incident wave propagating in a direction substantially perpendicular to the planes of the layers, so that the wave can pass through the stacked layers.

The structure A is advantageously placed between two semi-reflecting mirrors M1, M2. The wave therefore passes through the layers several times, which reinforces the saturable absorber effect without having to increase the number of layers.

In the various embodiments described in more detail hereinafter, each individual absorption structure a or b can include one or several layers of quantum boxes; the dimensions of the quantum boxes of each structure are chosen to obtain absorption wavelengths equal to the carrier wavelengths of the multiplexed signal $SE_{MUX}$.

Figure 2B:
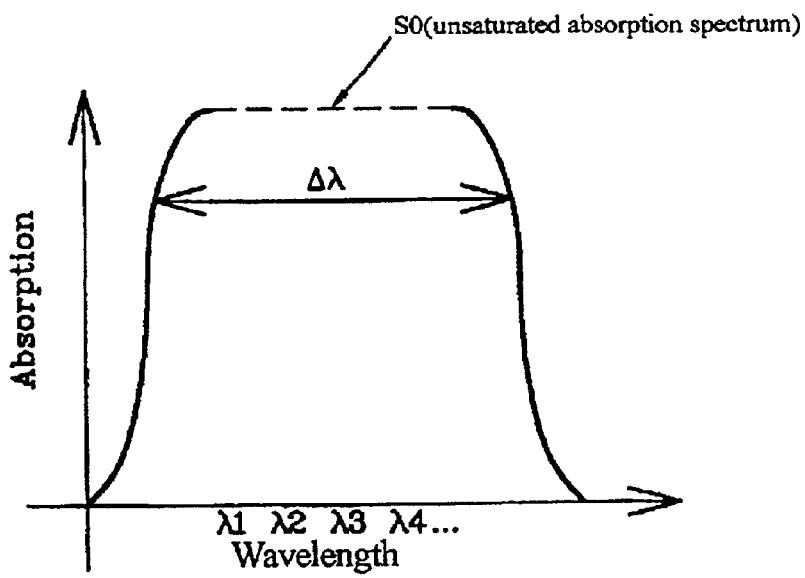
FIGS. 2b and 2c are diagrams showing curves SO and SA of absorption (i.e. the level of luminous power of the incident signal) as a function of wavelength for a saturable absorber material according to the invention.

FIG. 2b shows the unsaturated absorption spectrum SO, of predefined width $\Delta\lambda$, of the absorber according to the invention. This curve corresponds to the initial spectrum in the absence of incident power or when the signal on each channel of the multiplexed signals (for example on each of four channels $\lambda 1$, $\lambda 2$, $\lambda 3$, $\lambda 4$) is at a low level.

Figure 2C:
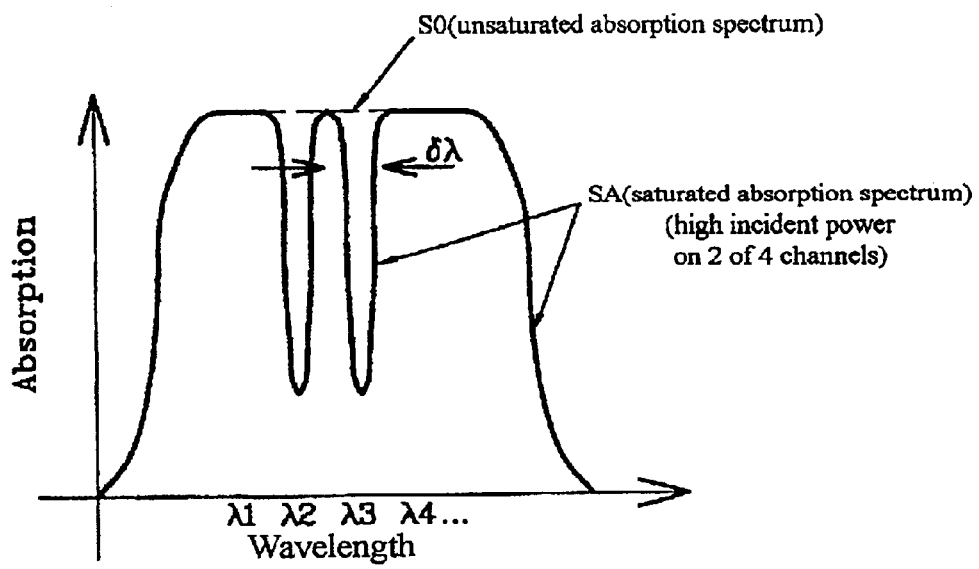

FIG. 2c shows the saturated absorption spectrum SA of the absorber according to the invention. This spectrum corresponds to one particular embodiment in which two channels (channels $\lambda 2$, $\lambda 3$) exhibit a power peak (the incident power is high for these two channels) while the other two channels ($\lambda 1$, $\lambda 4$) have zero incident power.

In the general case, the permissible number of channels in the absorption band of the absorber is given by the ratio $\Delta\lambda/\delta\lambda$, where $\delta\lambda$ is the width of an absorption line.

Two practical embodiments are described hereinafter and shown in FIGS. 3 and 4A, respectively. These embodiments relate to the two structures already referred to.

Figure 3:
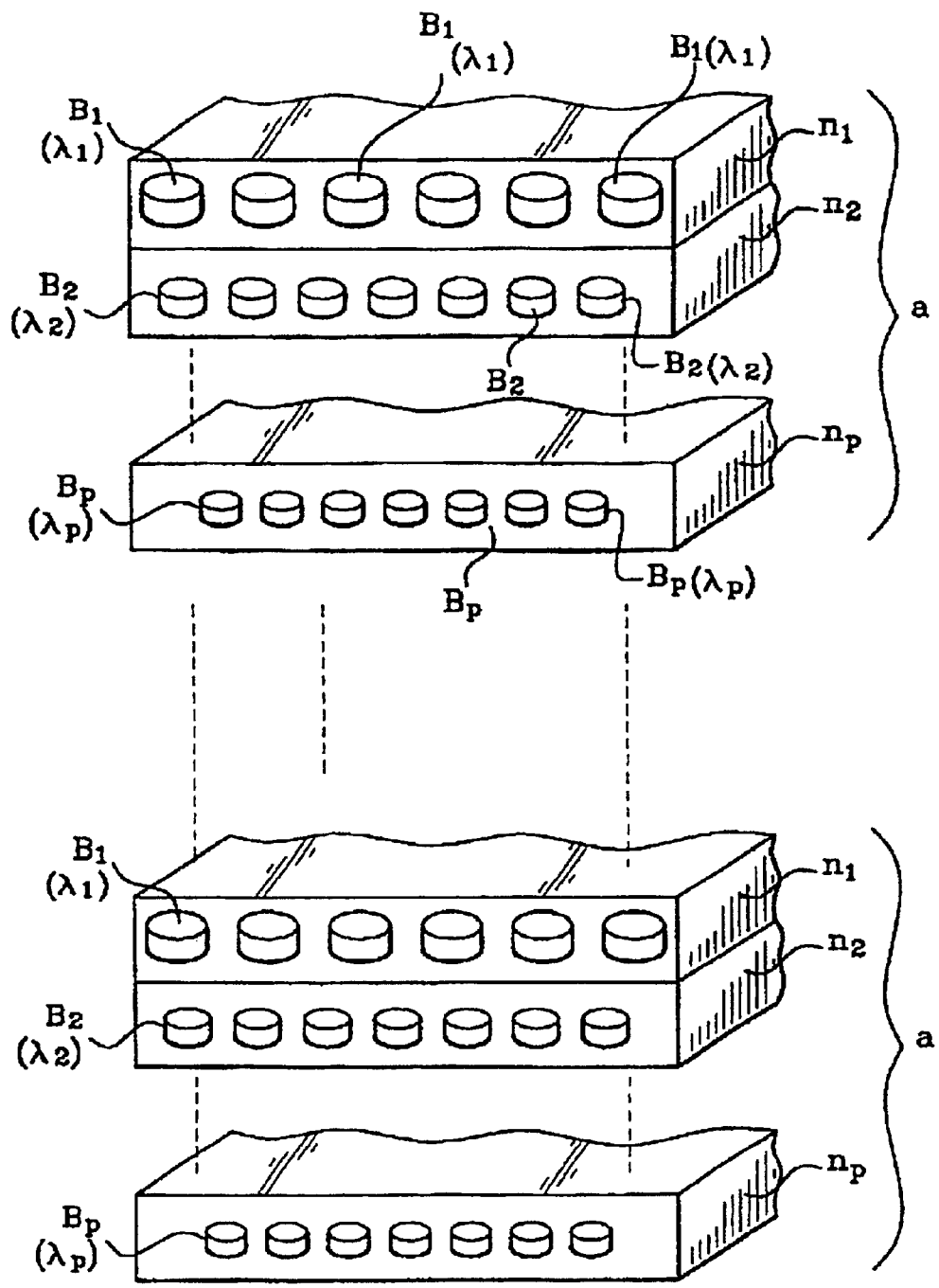
FIG. 3 shows the structure of a first embodiment of a saturable absorber.

FIG. 3 shows the situation in which each individual structure "a" is formed of a plurality of layers $n_1, n_2, \ldots, n_p$ including respective quantum boxes B1, B2, ..., Bp with dimensions chosen to obtain respective absorption wavelengths $\lambda 1$, $\lambda 2$, ..., $\lambda p$ corresponding to respective wavelengths of the input multiplexed signal.

Thus the layer $n_1$ includes boxes B1 whose dimensions are chosen to obtain an absorption wavelength $\lambda 1$ corresponding to the channel $\lambda 1$ of the multiplexed signal. The layer $n_p$ includes boxes Bp whose dimensions are chosen to obtain an absorption wavelength $\lambda p$ corresponding to the channel $\lambda p$ of the multiplexed signal, etc.

To constitute the stack A, this individual structure a is repeated N times, as shown in FIG. 3.

Thus each set of quantum boxes is formed of N layers of absorbant material with the same composition. The stack of layers belonging to different sets forms the individual absorption structure a.

Figure 4A:
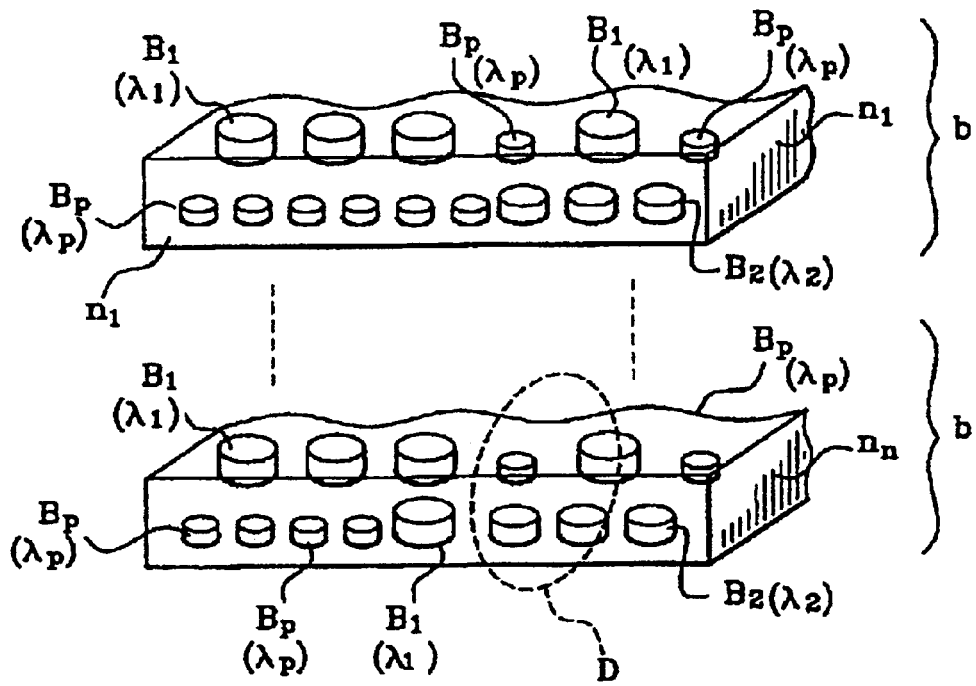
FIG. 4A shows the structure of a second embodiment of a saturable absorber.

FIG. 4A shows the second embodiment of the invention. In this embodiment, each layer $n_1, \ldots, n_n$ includes quantum boxes of more than one set. This layer constitutes an individual structure "b" which is repeated N times to form a stack A of layers. The structure A includes N layers, i.e. N individual absorption structures b.

Accordingly, the layer $n_1$, for example, includes quantum boxes B1 with dimensions chosen to obtain an absorption wavelength associated with the wavelength $\lambda 1$ corresponding the channel $\lambda 1$ of the multiplexed signal, absorption boxes B2 with dimensions chosen to obtain an absorption wavelength associated with the wavelength $\lambda 2$ corresponding the channel $\lambda 2$ of the multiplexed signal, and absorption boxes Bp with dimensions chosen to obtain an absorption wavelength associated with the wavelength $\lambda p$ corresponding the channel $\lambda p$ of the multiplexed signal.

The chosen number of repetitions of the individual structures a or b depends on numerous parameters. Regardless of the type of individual structure, one important choice is the total number of layers of quantum boxes constituting the stack A. This number must be high enough to achieve an effective saturable absorption effect, but it is necessary to take account of the fact that the bandwidth of the component is degraded as the number of layers increases.

It has been found that, with semi-reflecting mirrors M1 and M2 having a reflectivity of approximately 70%, choosing a total number of layers substantially equal to 80 constitutes a good compromise that achieves a satisfactory bandwidth. More generally, for a reflectivity significantly less than 70%, the total number of layers must be significantly greater than 80; reciprocally, for a reflectivity significantly greater than 70%, the total number of layers must be significantly less than 80.

Figure 4B:
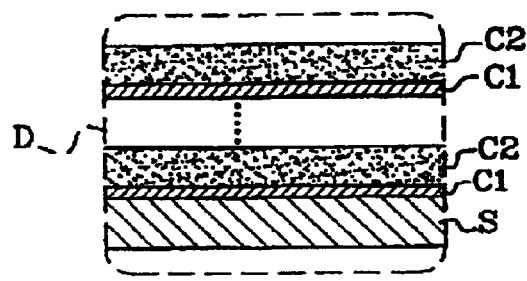
FIG. 4B shows a detail of the structure of a layer of absorbant material.

FIG. 4B shows the absorbant material structure corresponding to the two embodiments just described (detail D in FIG. 4A). This structure can be obtained by the Stranski-Krastanow growth method, which consists of:

epitaxially growing a wetting layer C1, of indium arsenide (InAs), for example, which has a slight (7%) lattice mismatch to an initial layer S, for example a gallium arsenide (GaAs) substrate, to the point at which quantum boxes or islands are formed (critical thickness: 1.5 to 1.7 monolayer);

growing a layer C2 with the same composition as the initial layer S (GaAs) to bury the quantum boxes; and growing on the new GaAs layer C2 the material InAs having the lattice mismatch therewith until that layer has a particular thickness and quantum boxes are formed again.

The above steps are repeated as many times as necessary to obtain the stack corresponding to the FIG. 3 or FIG. 4 embodiment.

Other pairs of materials can also be used to produce quantum boxes using the Stranski-Krastanow growth method: InGaAs/GaAs, InAs/InP, Ge/Si, PbSe/PbEuTe, GaN/AlN, etc.

Controlling the operating conditions (temperature, gas pressure) in the epitaxial growth phase fixes the required box sizes and the distances between boxes. Conditions must of course be chosen so that the distances between boxes are sufficiently large to prevent interaction between adjacent boxes.

The temperature in particular can be varied during each growth cycle.

When each layer corresponds to a given set of quantum boxes (FIG. 3 embodiment), growth cycles are executed which each form all the successive layers of the structure a. To this end the conditions are modified in a controlled manner from one layer to another. This embodiment has the advantage of allowing precise control of the absorption wavelengths.

If each layer consists of quantum boxes of all the sets (FIG. 4A embodiment), each growth cycle corresponds to forming that layer. With this embodiment, absorption wavelength control is less precise, but on the other hand the absorption lines are closer together, which makes the component more tolerant to wavelength fluctuations or drift of the signal to be regenerated.

A quantum box diameter of approximately 20 nm is obtained with the following growth conditions, for example: T=532° C., at a pressure equivalent to a flow of $As_4$ at $7 \times 10^{-6}$ torr, with an average rate of deposition of 0.01 monolayer per second, with an InAs coverage of 1.9 "monolayers" (i.e. practically two epitaxial layers) using a Ta mask swept continuously during growth. (cf reference [2]). The wavelength of the first absorption peak is 1.13 µm with a −3 dB bandwidth of 30 nm.

In this case the estimated density of the quantum boxes is $5 \times 10^9$ cm$^{-2}$, which achieves a saturation power of +50 dBm, and the estimated impulse response time of the component is 10 ps.

By modifying the conditions, for example by using an InAs coverage of 1.6 "monolayers", the size of the boxes can be as much as 30 nm, and quantum boxes are obtained with dimensions greater than just described and with a wider Gaussian distribution of the absorption spectrum. The box size achieves an absorption peak at 1.55 µm with a −3 dB bandwidth of 100 nm.

If the density of the quantum boxes is $5 \times 10^9$ cm$^{-2}$, the saturation power can be as low as +6 dBm with a response time of the component of 10 ps, or +15 dBm with a response time of 1 ps.

To obtain a fast saturable absorber, enabling use in high bit rate transmission applications, a prior art method is used to fabricate the absorber, for example: ionic irradiation of the absorbant layer, or growing a layer at low temperature between the burying material (for example GaAs) and the new wetting layer (InAs), or introducing dopants into the absorbant structure, or introducing controlled dislocations, or applying an external electrical field for evacuating photogenerated carriers. In this last case, it is necessary to provide electrodes covering the external faces of the structure or the mirrors, the electrodes having windows for injecting the signal to be regenerated and extracting the regenerated signal.

A detailed description of the above methods can be found in the following documents, for example:

[1]: French patent application 98 12 430, Fabrice Devaux, Alexandre Shen et al., published 7 Apr. 2000 as French patent No. 2 784 202, with the title "Dispositif de régénération d'un signal multiplexé en longueur d'onde comprenant un absorbant saturable" (Saturable absorber-based regeneration device for a WDM signal);

[2]: D. Leonard, K. Pond and P. M. Petroof, "Critical layer thickness for self-assembled InAs islands on GaAs", Physical Review B, vol 50, No. 16, 15 Oct. 1994, pp.11 687–11 692.

What is claimed is:

1. A saturable optical absorber comprising:

an inhomogeneous absorption material comprising:
a plurality of sets of quantum boxes, wherein said sets are associated with respective different absorption wavelengths, said quantum boxes of a given set have dimensions chosen to obtain an absorption wavelength associated with said set, and said quantum boxes are disposed in a plurality of stacked layers;

wherein said absorber is adapted to enable an incident optical wave to pass through said stacked layers; and two mirrors disposed on respective opposite sides of said stacked layers and parallel to or slightly inclined to said stacked layers.

2. The saturable optical absorber claimed in claim 1 wherein each of said layers includes quantum boxes of the same set, layers belonging to different sets are stacked and form an individual absorption structure, and said absorber includes a stack comprising a plurality of individual absorption structures.

3. The saturable optical absorber claimed in claim 1 including a stack comprising a plurality of layers each including quantum boxes of a plurality of sets.

4. The saturable optical absorber claimed in claim 1 wherein the total number of layers of quantum boxes constituting said stacked layers is significantly greater than 80 if said mirrors have a reflectivity significantly less than 70% and significantly less than 80 if said mirrors have a reflectivity significantly greater than 70%.

5. The saturable optical absorber claimed in claim 1 wherein said mirrors have a reflectivity substantially equal to 70% and the total number of layers of quantum boxes constituting said stacked layers is substantially equal to 80.

6. The saturable optical absorber claimed in claim 1 wherein said saturable absorber material further comprises a wetting layer of a binary material followed by a layer of said stacked layers, this alternation of wetting layers and layers of quantum boxes being repeated, the combination being deposited on a substrate.

7. A method of using a saturable absorber to regenerate a wavelength division multiplexed signal, comprising:

providing a saturable optical absorber comprising:
an inhomogeneous absorption material comprising:
a plurality of sets of quantum boxes, wherein said sets are associated with respective different absorption wavelengths, said quantum boxes of a given set have dimensions chosen to obtain an absorption wavelength associated with said set, and said quantum boxes are disposed in a plurality of stacked layers; and two mirrors disposed on respective opposite sides of said stacked layers and parallel to or slightly inclined to said stacked layers;

wherein said absorber is adapted to enable an incident optical wave to pass through said stacked layers; and passing a wavelength division multiplexed signal through said absorber, wherein the absorber will substantially reduce noise present in the signal.

* * * * *